United States Patent
Mehta et al.

(10) Patent No.: US 12,251,986 B2
(45) Date of Patent: Mar. 18, 2025

(54) AIR CONDITIONING SYSTEM WITH HIGH CAPACITY CENTRIFUGAL REFRIGERANT COMPRESSOR

(71) Applicant: Garrett Transportation I Inc, Torrance, CA (US)

(72) Inventors: Darius Mehta, Rancho Palos Verdes, CA (US); Robert Cadle, Carmel, IN (US)

(73) Assignee: GARRETT TRANSPORTATION INC., Torrance, CA (US)

(*) Notice: Subject to any disclaimer, the term of this patent is extended or adjusted under 35 U.S.C. 154(b) by 365 days.

(21) Appl. No.: 17/809,558

(22) Filed: Jun. 29, 2022

(65) Prior Publication Data
US 2024/0001734 A1    Jan. 4, 2024

(51) Int. Cl.
B60H 1/00    (2006.01)

(52) U.S. Cl.
CPC ..... B60H 1/00899 (2013.01); B60H 1/00278 (2013.01)

(58) Field of Classification Search
CPC ............ B60H 1/00899; B60H 1/00278; B60H 1/00342; B60H 1/00392; B60H 1/3223; B60H 1/32281; F25B 2313/003; F25B 2313/02742; F25B 2400/06; F25B 2700/2104; F25B 2700/2106; F25B 49/02
See application file for complete search history.

(56) References Cited

U.S. PATENT DOCUMENTS

| 10,967,702 B2 | 4/2021 | Mancini et al. |
| 2008/0251235 A1 | 10/2008 | Zhou |
| 2019/0263223 A1* | 8/2019 | Durrani ............. B60H 1/00921 |
| 2019/0315194 A1* | 10/2019 | Kim ..................... B60H 1/04 |
| 2019/0323511 A1 | 10/2019 | Gashi et al. |
| 2020/0247212 A1* | 8/2020 | Bara ................. B60H 1/32284 |
| 2021/0188043 A1* | 6/2021 | Smith ............... B60H 1/00278 |
| 2022/0324294 A1* | 10/2022 | Kim ................. B60H 1/00921 |
| 2023/0020687 A1* | 1/2023 | Kim ..................... H01M 10/613 |

FOREIGN PATENT DOCUMENTS

| CN | 112319181 A | * | 2/2021 | ......... B60H 1/00278 |
| CN | 112406494 A | * | 2/2021 | ......... B60H 1/00278 |
| CN | 113119680 A | * | 7/2021 | ......... B60H 1/00257 |
| DE | 112018005735 T5 | * | 7/2020 | ......... B60H 1/00278 |
| EP | 1329344 A1 | | 7/2003 | |
| EP | 2327575 A1 | | 6/2011 | |
| WO | 0138117 A1 | | 5/2001 | |
| WO | 2021261320 A1 | | 12/2021 | |
| WO | WO-2022131660 A1 | * | 6/2022 | ......... B60H 1/00278 |

* cited by examiner

Primary Examiner — Kun Kai Ma
(74) Attorney, Agent, or Firm — LORENZ & KOPF, LLP

(57) ABSTRACT

An electric vehicle thermal management system for compressing a low pressure refrigerant with a centrifugal compressor to generate a high pressure refrigerant, determining a battery cooling condition, routing one of the low pressure refrigerant and the high pressure refrigerant to the heat exchanger in response to the battery cooling condition, regulating a transfer of heat between the refrigerant loop and the battery cooling loop in response to a temperature of the battery coolant within the battery cooling loop and the battery cooling condition, and regulating the transfer of heat between the battery coolant loop and a cabin coolant loop in response to the HVAC setting and a cabin coolant temperature within the cabin coolant loop.

18 Claims, 4 Drawing Sheets

AIR CONDITIONING SYSTEM WITH HIGH CAPACITY CENTRIFUGAL REFRIGERANT COMPRESSOR

TECHNICAL FIELD

The present disclosure generally relates to an electric vehicle air conditioning system and, more particularly, relates to an integrated electric vehicle battery and cabin air conditioning system employing a high capacity centrifugal refrigerant compressor to compress refrigerant for heating and cooling of an electric vehicle battery and a vehicle cabin.

BACKGROUND

Electric vehicles are now becoming more and more common in the passenger vehicle marketplace. A barrier to widespread adoption of electric vehicles is that a vehicle's range is limited by its battery capacity. As electrical vehicles take longer to recharge than combustion engine vehicles take to fill a fuel tank, this extra charging time may discourage some people from purchasing an electrical vehicle. As more features and/or increased vehicle range require more battery capacity, it is desirable to be able to recharge the batteries as quickly as possible to allow for vehicle trips longer than the range of one battery charge.

Increased battery capacity, along with increased battery discharge rates and increased DC fast charging rates result in increased heat generated during fast battery charging and discharge. Newly introduced "extreme" fast charging levels will soon be 300+ kWdc. The vehicles being charged will require enhanced cooling systems to reduce the heat generated during the "extreme" fast charging operations. In addition, as more and more features are added to an electric vehicle, such as heating and cooling, safety features, infotainment and communications features, autonomous driving vehicle controllers and the like, the need for enhanced cooling will also be required during vehicle operation.

Currently to meet the demand for electric vehicle cooling, conventional scroll type air conditioning (AC) compressors are used. These scroll type AC compressors suffer from excessive noise, vibration, and harshness (NVH) levels. As the requirements for enhanced cooling increase, larger and larger AC compressors are required to meet the cooling demands for these batteries during vehicle operation and during fast charging, thereby exacerbating the NVH issues. The larger the scroll type AC compressor the greater the NVH levels. The peak cooling requirements are typically only required during fast charging making the large scroll compressor a liability during normal vehicle operation. Thus, it is desirable to provide increased battery and cabin air conditioning capabilities while reducing the NVH levels. Other desirable features and characteristics of the present disclosure will become apparent from the subsequent detailed description and the appended claims, taken in conjunction with the accompanying drawings and this background discussion.

BRIEF SUMMARY

In one embodiment, an electric vehicle thermal management system including a user interface for receiving a HVAC setting, a centrifugal compressor for compressing a low pressure refrigerant in a refrigerant loop to generate a high pressure refrigerant, an expansion valve for reducing a pressure of the high pressure refrigerant in the refrigerant loop to generate the low pressure refrigerant, a heat exchanger coupled to the refrigerant loop, a battery coolant loop and a cabin coolant loop, and a processor for detecting a battery cooling condition, routing one of the low pressure refrigerant and the high pressure refrigerant to the heat exchanger in response to the battery cooling condition, regulating the transfer of heat between the refrigerant loop and the battery cooling loop in response to a temperature of the battery coolant within the battery cooling loop and the battery cooling condition, and regulating the transfer of heat between the battery coolant loop and a cabin coolant loop in response to the HVAC setting and a cabin coolant temperature within the cabin coolant loop.

In another embodiment, a method including compressing a low pressure refrigerant with a centrifugal compressor to generate a high pressure refrigerant, determining a battery cooling condition, routing one of the low pressure refrigerant and the high pressure refrigerant to the heat exchanger in response to the battery cooling condition, regulating a transfer of heat between the refrigerant loop and the battery cooling loop in response to a temperature of the battery coolant within the battery cooling loop and the battery cooling condition, and regulating the transfer of heat between the battery coolant loop and a cabin coolant loop in response to the HVAC setting and a cabin coolant temperature within the cabin coolant loop.

Moreover, a heat exchanger configured to exchange heat between a refrigerant loop, a battery coolant loop and a cabin coolant loop, a centrifugal compressor for compressing a low pressure refrigerant in the refrigerant loop to generate a high pressure refrigerant, an expansion valve for reducing a pressure of the high pressure refrigerant in the refrigerant loop to generate the low pressure refrigerant, a valve for coupling one of the high pressure refrigerant and the low pressure refrigerant to the heat exchanger via the refrigerant loop in response to a valve control signal, a battery coolant pump for regulating the flow of a battery coolant in response to a battery coolant pump control signal, a cabin coolant pump for regulating the flow of a cabin coolant in response to a cabin coolant pump control signal, and a processor for determining a battery cooling condition in response to a battery cooling condition and a battery temperature, generating the valve control signal and the battery coolant pump control signal in response to the battery cooling condition and a battery temperature, and generating the cabin coolant pump control signal in response to an HVAC setting and a cabin coolant temperature.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved electric vehicle cooling heating ventilation and air conditioning (HVAC) system using a centrifugal compressor. The HVAC system may be integrated into, packaged among, and compactly arranged within a battery electric vehicle (BEV) for improved performance and for reducing the size and profile of the battery cooling compressor. In some embodiments, the HVAC system may include a plurality of refrigerant and liquid coolant loops which are selectively used to achieve current battery and vehicle cabin heating and cooling requirements.

The centrifugal compressor offers advantages over the incumbent scroll compressor for BEV AC applications. Primarily, centrifugal compressors exhibits much lower NVH, a common customer complaint from scroll compressors today. As DC fast charging rates increase to 300+ kWdc, the AC compressor size must also increase, exacerbating the NVH issue.

A second benefit of centrifugal compressors is compactness. A centrifugal compressor can be 60% of the size and mass of a scroll compressor of the same heat rejection capacity. A challenge for centrifugal compressors is limited map width where refrigerant compression capabilities may not be sufficient to accommodate the corner cases of cooling loads. For example centrifugal compressors may have difficulty accommodating 10 g/s refrigerant flow at 4:1 PR for a light cabin load, and also 180 g/s at 6:1 PR for combined high battery and cabin loads. Therefore current scroll compressors may not be directly substituted with a centrifugal compressor into a fully integrated BEV thermal system and maintain the full range of cooling and heating loads. However, the currently disclosed heating and cooling system takes advantage of the centrifugal compressor's benefits while addressing its limitations.

Figure 1:
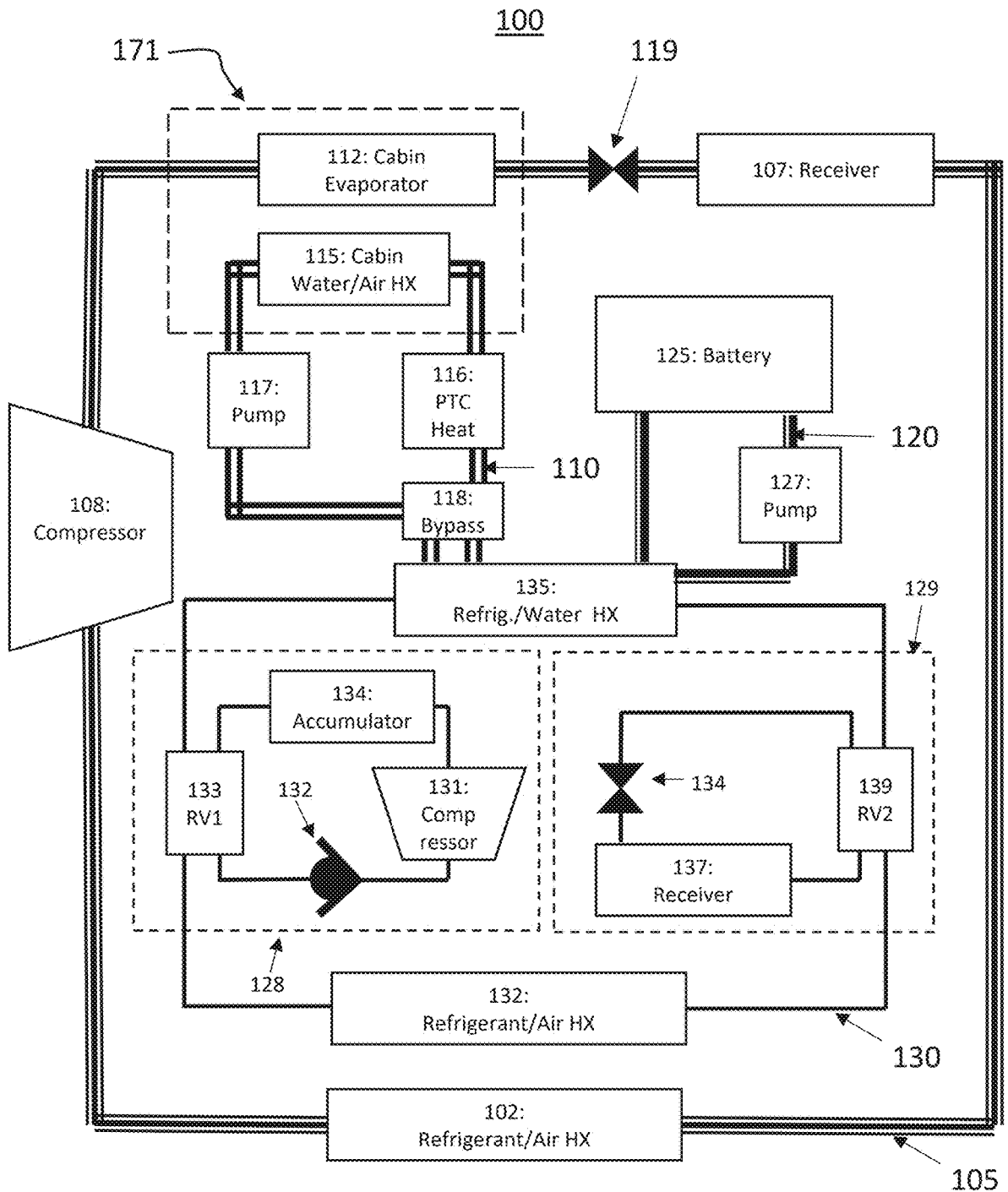
FIG. 1 illustrates an exemplary electric vehicle air conditioning and battery cooling system according to exemplary embodiments of the present disclosure.

Turning now to FIG. 1, an exemplary electric vehicle air conditioning and battery cooling system 100 is shown. The exemplary system 100 includes a refrigerant loop 130, a battery liquid cooling loop 120, a cabin heating liquid loop 110 and a cabin cooling refrigerant loop 105. In this exemplary embodiment, the refrigerant flow of the refrigerant loop 130 is reversable by modifying a direction of each of the first reversing valve 133 and a second reversing valve 139.

Generally, the exemplary cabin cooling refrigerant loop 105 is configured to generate low temperature air within the vehicle cabin 171 to cool the vehicle cabin 171. The cabin cooling refrigerant loop 105 includes a compressor 108 for increasing the pressure of the refrigerant. A refrigerant to air heat exchanger 102, located outside of the vehicle cabin 171, is next provided on the cabin cooling loop 105 for receiving the high pressure refrigerant from the compressor 108. The refrigerant to air heat exchanger 102 provides a thermal coupling between the compressed refrigerant and the outside air and is operative to release heat from the compressed refrigerant to the air outside of the vehicle cabin 171. The refrigerant to air heat exchanger 102 may be equipped with a fan to move air through the refrigerant to air heat exchanger 102 in order to increase cooling performance.

The cabin cooling refrigerant loop 105 further includes a first receiver 107 for storing oil and refrigerant, filtering debris and for absorbing moisture that may have entered the high pressure refrigerant in the cabin cooling refrigerant loop 105. The cabin cooling refrigerant loop 105 next includes an electronic expansion valve (eXV) 119 for releasing the refrigerant from the high pressure side of the cabin cooling refrigerant loop 105 to a lower pressure. Releasing pressure from the refrigerant quickly cools the refrigerant which is next released into the cabin evaporator 112. The evaporator 112 is located within the vehicle cabin 171 and may be co-located with a HVAC fan to move cabin air through the evaporator 112. Cabin air is cooled as it is moved through the evaporator 112 containing the cold, low pressure refrigerant and is introduced into the vehicle cabin 171 to reduce the cabin temperature. Fan speed may be altered to regulate the cooling of the vehicle cabin 171. The low pressure refrigerant is then returned to the compressor 108.

The compressor 108 in the cabin cooling refrigerant loop 105 may be a scroll type compressor or may be a centrifugal compressor. A scroll type compressor, which is typically used in current air conditioning systems, uses a fixed scroll and an orbiting scroll to move refrigerant into the center of the scroll, thereby reducing the volume and increasing the pressure of the refrigerant. Scroll type compressors may use multiple stages to further increase the pressure of the refrigerant. Scroll type compressors however suffer from high vibration and noise levels which increase with the size of the compressor. A centrifugal compressor may be used, where an electric motor is used to control the rotational speed of a rotor, thereby controlling the output pressure of the high pressure refrigerant. Advantageously, the speed of the rotor may be varied in response to cooling demand, thereby reducing any noise and vibration during low cooling demand operation.

The refrigerant loop 130 is configured to extract heat from the battery 125, provide heat to the battery 125 and/or to provide heating and augmented cooling to the vehicle cabin 171. The refrigerant loop 130 includes four main portions, a refrigerant to air heat exchanger 132, a compressor loop 128, a receiver loop 137 and a refrigerant to water heat exchanger 135. The first reversing valve 133 and the second reversing valve 139 within the refrigerant loop 130 allow hot, high pressure refrigerant to be delivered either to the refrigerant air heat exchanger 132 located outside of the vehicle cabin 171 during a first mode of operation or a refrigerant water heat exchanger 135 coupled to the battery cooling loop 120 and the cabin coolant loop 110 during a second mode of operation. In some exemplary embodiments, the refrigerant water heat exchanger 135 is configured to exchange heat between the refrigerant loop 130, the battery cooling loop 120 and the cabin coolant loop 110. In some exemplary embodiments, each of the refrigerant loop 130, the battery cooling loop 120 and the cabin coolant loop 110 may not share coolant or refrigerant with the other loops. Each loop may be independent and may couple heat to another of the loops within the refrigerant water heat exchanger 135.

In both the first mode of operation and the second mode of operation, the first reversing valve 133 is configured to couple low pressure refrigerant from the refrigerant loop 130 to the accumulator 134. The accumulator 134 is configured to collect any liquid refrigerant that may be in the low pressure side of the refrigerant loop 130 before it reaches the centrifugal compressor. The accumulator 134 may further include desiccant to absorb any moisture in the refrigerant and also may act as a reservoir for oil and other debris. The accumulator 134 then couples the low pressure refrigerant to the centrifugal compressor 131. The centrifugal compressor 131 is configured to compress the volume of the low pressure refrigerant to deliver high pressure, high temperature refrigerant to a check valve 132 and back to the first reversing valve 133. The check valve 132 prevents any high pressure refrigerant from being fed back into the outlet of the centrifugal compressor 131. The pressure of the high pressure refrigerant is regulated by a rotational speed of the centrifugal compressor 131 which is driven by a variable speed electric motor.

In both the first mode of operation and the second mode of operation, the second reversing valve 139 is configured to couple high pressure refrigerant to a second receiver 137 for storing oil and refrigerant, filtering debris and for absorbing moisture that may have entered the high pressure refrigerant in the refrigerant loop 130. The high pressure refrigerant is next coupled to an electronic expansion valve (eXV) 134 to generate colder, low pressure refrigerant for coupling back into the refrigerant loop by the second reversing valve 139.

During a first mode of operation, the first reversing valve 133 is configured to couple the high pressure refrigerant to the refrigerant air heat exchanger 132 located outside of the vehicle cabin. The temperature of the high pressure refrigerant is reduced through refrigerant to air heat exchange in the refrigerant air heat exchanger 132. The high pressure refrigerant is then coupled to the eXV 134 by the second reversing valve 139. The second reversing valve 139 is further configured to couple the colder, low pressure refrigerant from the eXV 134 to the refrigerant water heat exchanger 135. The low pressure refrigerant is then coupled from the refrigerant water heat exchanger 135 back to the first reversing valve 133. The first mode of operation is primarily operative to cool the battery 125 and may be used to heat and/or cool the vehicle cabin 171.

During the second mode of operation, the flow direction of the refrigeration loop is reversed and the high pressure refrigerant is coupled from the centrifugal compressor 131 to the refrigerant water heat exchanger 135 by the first reversing valve 133. The high pressure refrigerant is next coupled to the eXV 134 by the second reversing valve 139. The low pressure refrigerant from the eXV 139 is then coupled to the refrigerant air heat exchanger 132 by the second reversing valve 139. The low pressure refrigerant is then coupled from the refrigerant air heat exchanger 132 back to the centrifugal compressor 131 by the first reversing valve 133. The second mode of operation is operative primarily to heat the battery during vehicle low temperature operations and may be used for heating the vehicle cabin 171. The optimal operating temperature range for an electric vehicle battery is between 20° C. and 55° C. Operating an electric vehicle battery below 20° C. may reduce range of the electric vehicle by half or more. In particular, electric heaters for the battery 125 and vehicle cabin 171 require significant electric power which may quickly reduce battery charge levels.

The battery cooling loop 120 is configured to receive a battery coolant, such as water, antifreeze or other liquid coolant from the refrigerant water heat exchanger 135 and to provide this battery coolant to the battery 125 for use in the battery liquid cooling system. The flow of the battery coolant is regulated by a battery coolant pump 127 which returns the battery coolant back to the refrigerant water heat exchanger 135. In the first mode of operation, the refrigerant water heat exchanger 135 receives low pressure cold refrigerant from the eXV 134 in the refrigerant loop 130. This low pressure cold refrigerant is used to cool the battery coolant within the refrigerant water heat exchanger 135 for use by the battery cooling loop 120. This cooled refrigerant is coupled to the battery 125 for cooling the battery 125. During the first mode of operation, the battery coolant heated by the thermal exchange between the battery coolant and the battery 125 during the battery cooling operation may further be routed, either directly or after further thermal coupling within the refrigerant water heat exchanger 135, to the cabin heating coolant loop 110 and provided to the cabin water air heat exchanger 115 via a bypass valve 118 and a pump 117. If additional heat is required in the cabin heating liquid loop 110, a positive temperature coefficient (PTC) heater 116 may be activated to further heat the cabin coolant within the cabin heating coolant loop 110. The bypass valve 118 and the PTC heater 116 may be activated and deactivated during cabin HVAC operations to regulate the temperature within the vehicle cabin 171. In addition, under certain conditions, such as when battery cooling is not required and ambient temperature is relatively low, the cabin coolant within the cabin heating liquid loop 110 may be cooled by the low pressure cold refrigerant from the eXV 134 to provide cooling to the vehicle cabin 171 via the cabin water air heat exchanger 115. This cooling may be provided in lieu of, or in addition to, the cooling provided via the cabin cooling refrigerant loop 105. Advantageously, this additional cabin cooling capability may reduce the cooling requirements, and therefore lower the required size of the scroll compressor 108, or may facilitate the use of a centrifugal compressor in lieu of the scroll compressor 108 and will reduce NVH of the cabin cooling system. The battery cooling loop 120, according to this exemplary embodiment, may achieve more than 17 kWq battery cooling during fast charging and high vehicle loads.

In the second mode of operation, the high pressure, high temperature refrigerant is coupled from the centrifugal compressor 131 to the refrigerant water heat exchanger 135. This high temperature refrigerant may be used to heat the battery during low temperature electric vehicle operation. During low temperature operations, such as below 0° C., electrochemical reactions within the battery may slow thereby decreasing available power, acceleration, and/or driving range. In addition, there is a higher potential for battery damage during low temperature charging. In addition to heating the battery, the high temperature refrigerant may also be used to provide heat exchange to the cabin heating coolant loop 110 for cabin heating.

Figure 2:
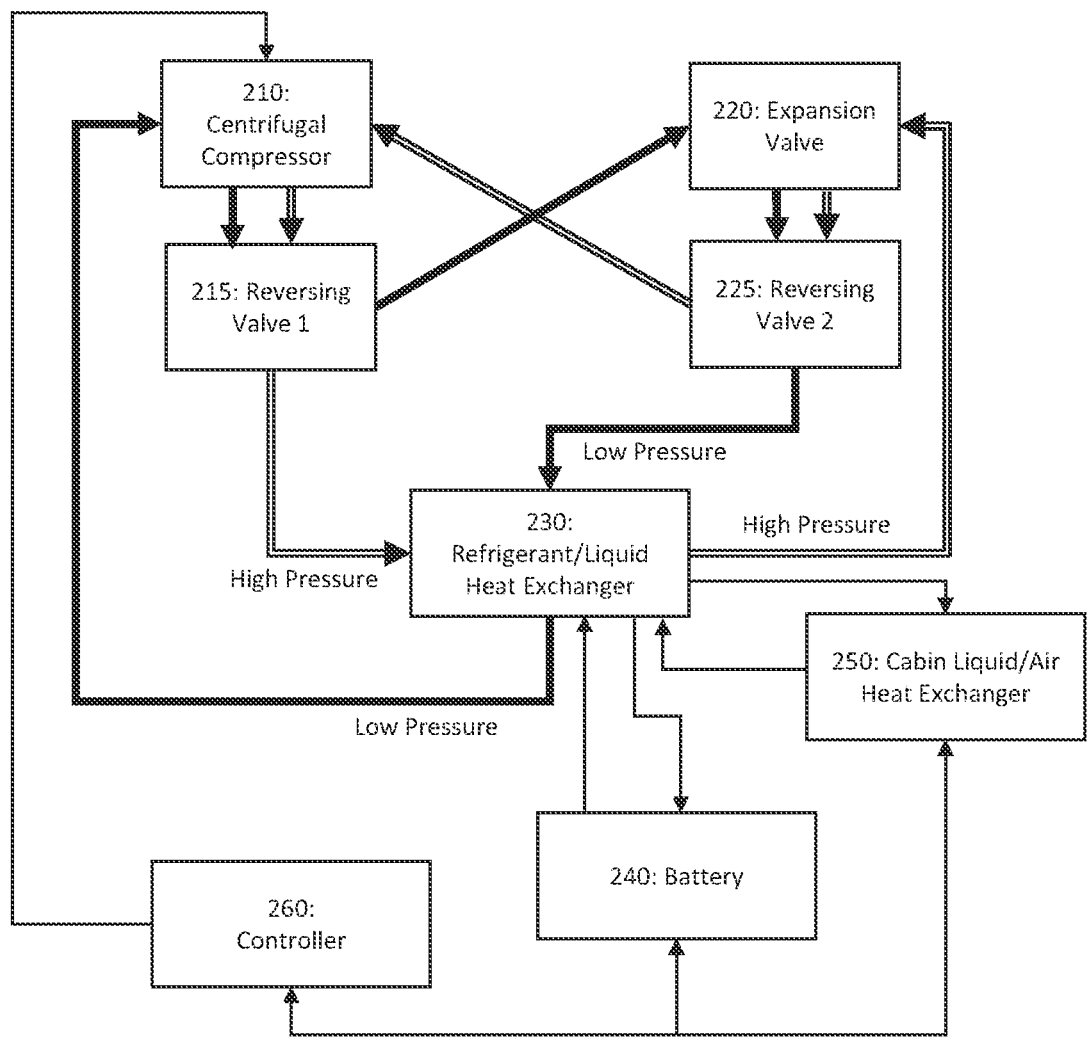
FIG. 2 illustrates an exemplary electric vehicle air conditioning and battery cooling system according to an exemplary embodiments of the present disclosure.

Referring now to FIG. 2, an exemplary battery and vehicle cabin thermal management system 200 according to various embodiments is shown. The exemplary system 200 is configured to provide battery cooling during various electric vehicle use cases as well as vehicle cabin HVAC to regulate vehicle cabin temperature. The exemplary system 200 may include a centrifugal compressor 210, an expansion valve 220, a first reversing valve 215, a second reversing valve 225, a refrigerant to liquid heat exchanger 230, a battery 240 and a cabin liquid to air heat exchanger 250.

The exemplary system includes a centrifugal compressor 210 to compress the volume of a refrigerant. In some exemplary embodiments, the centrifugal compressor 210 may be sized for 17+ kWq cooling load and 9+ kWq heating load, where kWq is a measure of heat transfer rate. The centrifugal compressor 210 may further include a check valve at the output of the centrifugal compressor 210 to prevent backflow of higher pressure refrigerant into the centrifugal compressor 210 output. The centrifugal compressor 210 input may further be coupled to an accumulator for preventing liquid refrigerants or other contaminants from entering the centrifugal compressor 210.

The output of the centrifugal compressor 210 is coupled to a first reversing valve 215. The first reversing valve 215 is configured to direct the high pressure refrigerant from the centrifugal compressor 210 output to either the expansion valve 220 in a first mode of operation, or the refrigerant liquid heat exchanger 230 in a second mode of operation. Generally speaking, the first mode of operation couples low temperature, low pressure refrigerant to the refrigerant liquid heat exchanger 230 where the second mode of operation couples high temperature, high pressure refrigerant to the refrigerant liquid heat exchanger 230.

In the first mode of operation, generally depicted by the double flow lines, the first reversing valve 210 couples high pressure refrigerant to the expansion valve 220. In some exemplary embodiments, the high pressure refrigerant may be coupled through a refrigerant to air heat exchanger located outside of a vehicle cabin for example, to reduce the temperature of the high pressure refrigerant. The expansion valve 220 is next operative to reduce the pressure of the refrigerant to generate a low temperature, low pressure refrigerant. The low temperature, low pressure refrigerant is then coupled to the refrigerant liquid heat exchanger 230 via the second reversing valve. The first mode of operation may be used to cool the battery and/or heat the vehicle cabin.

In the second mode of operation, generally depicted by the bold single flow lines, the first reversing valve is configured to couple the high temperature, high pressure refrigerant to the refrigerant liquid heat exchanger 230. The high pressure refrigerant is next coupled from the refrigerant liquid heat exchanger 230 to the expansion valve 220 where the pressure is reduced to generate a low temperature low pressure refrigerant. The low pressure refrigerant is then coupled from the expansion valve 330 back to the centrifugal compressor 210 via the second reversing valve 225. The second mode of operation may be used to warm the battery and/or heat the vehicle cabin.

In some exemplary embodiments, one or more liquid coolant loops are configured to conduct liquid coolant from the refrigerant liquid heat exchanger 230 to the battery 240 and/or the cabin liquid air heat exchanger 250. The liquid coolant may be a water based or glycol based solution which may conduct heat within the refrigerant liquid heat exchanger 230 to the low temperature, low pressure refrigerant in the first mode of operation, or conduct or absorb heat with the high pressure, high temperature refrigerant in the second mode of operation. In the second mode of operation, the liquid coolant may conduct or absorb heat with the high pressure, high temperature refrigerant according to a temperature differential between the liquid coolant and the high pressure refrigerant.

In some exemplary embodiments, a liquid battery coolant is coupled from the refrigerant liquid heat exchanger 230 to the battery 240 wherein the battery includes an integrated liquid cooling system. The battery coolant is operative to absorb heat from the battery during vehicle operation and/or battery charging operations. The battery coolant may then be returned to the refrigerant liquid heat exchanger 230 where heat from the battery may be coupled to the cabin heating loop and coupled to a cabin liquid air heat exchanger 250 for use in regulating a vehicle cabin temperature. The cabin heating loop may be configured with a bypass valve to prevent coolant heated by the battery coolant loop from being cycled through the cabin liquid air heat exchanger 250.

The flow of the liquid coolant and the refrigerant of the exemplary system 200 may be controlled by a controller 260, such as an HVAC controller or BEV system controller 260 in response to the cooling requirements of the battery 240, vehicle cabin HVAC requests received via a user interface within a vehicle cabin from a vehicle occupant. For example, the controller 260 may be configured to control a rotational speed of the centrifugal controller 210 and the valve positions of the first reversing valve 215 and the second reversing valve 225 in response to a temperature detected within the battery 240 and an operating mode of the battery 240. Operating modes of the battery may include charging, fast charging, propulsion mode, standby mode and the like. The controller 260 may be configured to switch each of the first reversing valve 215 and the second reversing valve 225 to configure the thermal management system 200 to be in either the first operating mode or the second operating mode.

In some exemplary embodiments, the refrigerant liquid heat exchanger 230 incorporates three separate refrigerant/coolant loops in a configuration where heat may be exchanged between any of the three separate refrigerant/coolant loops to any of the other three separate refrigerant/coolant loops. For example, battery coolant loop may be first cooled by exchanging heat with the refrigerant loop when the refrigerant loop carries low temperature, low pressure refrigerant. The battery coolant in the battery coolant loop may then absorb heat from the battery, such as during battery charging operations. The cabin coolant in the cabin coolant loop may then absorb heat from the heated battery coolant to be used for climate control in the vehicle cabin. Likewise, high pressure, high temperature refrigerant may be used to heat both the battery coolant loop and the cabin coolant loop during cold weather operations.

Figure 3:
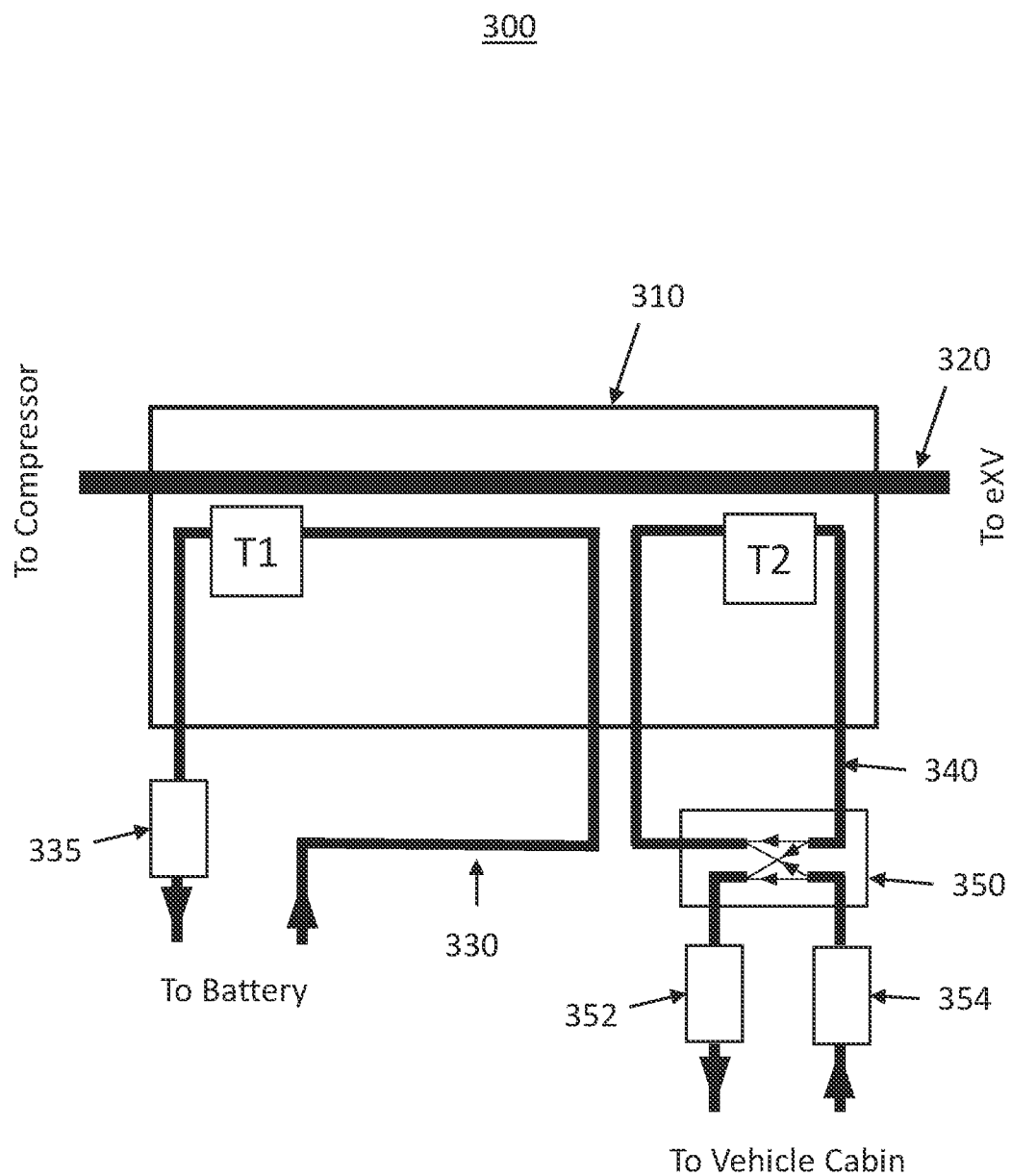
FIG. 3 illustrates an exemplary electric vehicle battery and vehicle cabin thermal management system for use with a centrifugal compressor according to exemplary embodiments of the present disclosure.

Turning now to FIG. 3, an exemplary electric vehicle battery and vehicle cabin thermal management system 300 for use with a centrifugal compressor according to various embodiments is shown. The exemplary thermal management system 300 may include a refrigerant liquid heat exchanger 310, a refrigerant loop 320, a battery coolant loop 330, a battery coolant pump 335, a first temperature sensor T1, a cabin coolant loop 340, a second temperature sensor T2, a cabin coolant bypass switch 350, a cabin coolant pump 354 and a TPC heater 352.

In some exemplary embodiments, the refrigerant liquid heat exchanger 310 may be configured to transfer heat between each of the a refrigerant loop 320, a battery coolant loop 330, and the cabin coolant loop 340. Although shown as simple loops for ease of depiction, each of the loops may be alternately configured in order to maximize thermal coupling between loops.

In a first mode of operation where battery cooling is required, the refrigerant liquid heat exchanger 310 is configured to receive low temperature, low pressure refrigerant from the centrifugal compressor. The battery coolant pump 335 is activated to pump battery coolant through the battery coolant loop 330. The battery coolant in the battery coolant loop 330 accordingly transfers heat to the refrigerant in the refrigerant loop 320. The first temperature sensor T1 detects the temperature of the battery coolant and a flow rate of the battery coolant pump 335 is regulated in response to the battery coolant temperature, and/or a battery temperature, in order to regulate the battery cooling. The first temperature sensor T1 may be located anywhere on the battery coolant loop 330 such that a battery coolant temperature may be determined at an optimal location.

In the first mode of operation wherein the battery coolant is being cooled by the refrigerant, the cabin coolant loop 340 is configured to initially circulate cabin coolant through the cabin coolant loop 340 with the cabin coolant pump 354. The temperature of the cabin coolant is next measured by the second temperature sensor T2. The second temperature sensor T2 may be located anywhere on the cabin coolant loop 340 such that a cabin coolant temperature may be determined at an optimal location. The system 300 next compares the cabin coolant temperature to an HVAC requirement. The system 300 may activate the cabin coolant bypass switch 350 in response to the cabin coolant temperature being outside of an acceptable range for the HVAC requirement. For example, if the cabin coolant temperature is too low, the cabin coolant bypass switch 350 may isolate the cabin portion of the cabin coolant loop from the heat exchanger portion and activate the TPC heater 353 to heat the cabin coolant within the cabin portion.

In the second mode of operation, the refrigerant liquid heat exchanger 310 is configured to receive high temperature, high pressure refrigerant from the electronic expansion valve (eXV). The heat from the refrigerant may be transferred to the battery coolant in the battery coolant loop 330. The battery coolant pump 335 flow rate may be regulated in response to the battery coolant temperature as detected by the first temperature sensor T1. The battery coolant will further absorb heat from the battery during the battery cooling operation. This gained heat may be then thermally transferred to the cabin cooling loop 340 for use in climate control within the vehicle cabin.

In the second mode of operation wherein the battery coolant is being heated by the refrigerant, the cabin coolant loop 340 is configured to circulate cabin coolant through the cabin coolant loop 340 with the cabin coolant pump 354. The temperature of the cabin coolant is next measured by the second temperature sensor T2. The second temperature sensor T2 may be located anywhere on the cabin coolant loop 340 such that a cabin coolant temperature may be determined at an optimal location. The system 300 next compares the cabin coolant temperature to an HVAC requirement. The system 300 may activate the cabin coolant bypass switch 350 in response to the cabin coolant temperature being outside of an acceptable range for the HVAC requirement. In some exemplary embodiments, where the temperature of the cabin coolant is lower than a vehicle cabin temperature, the cabin coolant loop 340 may be used to partially cool the vehicle cabin in lieu of, or in addition to, a vehicle cabin air conditioning system.

Figure 4:
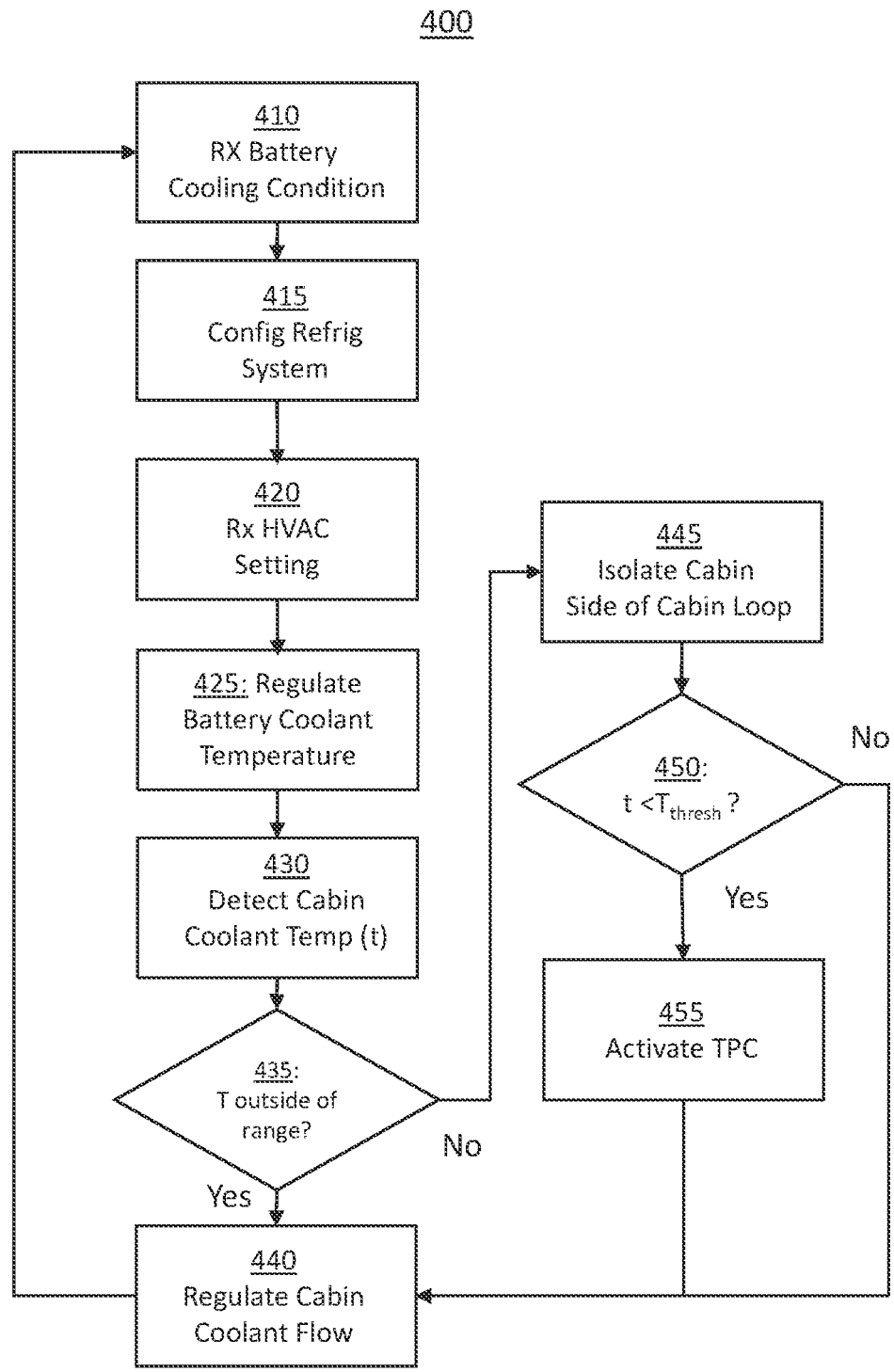
FIG. 4 illustrates an exemplary method for controlling an electric vehicle battery and vehicle cabin thermal management system according to an exemplary embodiment according to exemplary embodiments of the present disclosure.

Turning now to FIG. 4, an exemplary method for controlling an electric vehicle battery and vehicle cabin thermal management system 400 according to various embodiments is shown. The method is first operative for determining 410 a battery cooling condition. The battery cooling condition may be determined in response to a battery temperature, a battery operating state, an ambient environmental temperature, a vehicle operating condition, or a battery charging state. The battery temperature and/or ambient environmental temperature may be determined using a temperature sensor mounted in the battery or on the vehicle body. The vehicle operating conditions, battery operating state, or battery charging state may be determined in response to data from a battery controller, vehicle controller, or user interface.

The refrigerant system is next configured 415 in response to the battery cooling condition. Some battery cooling conditions may require the battery to be cooled or warmed depending on the battery cooling condition. The optimal operating temperature range for an electric vehicle battery is between 20° C. and 55° C. The battery cooling system may be configured for routing the refrigerant in response to the battery cooling condition. For example, during high battery cooling demand, such as fast charging, low temperature, low pressure refrigerant may be routed to the battery coolant and cabin coolant heat exchanger such that the battery coolant can be quickly cooled in anticipation of the temperature rise expected with fast charging. Alternatively, if the ambient temperature is below 0° C. for example, the refrigerant flow may be reversed within the refrigerant loop in order to deliver high temperature, high pressure refrigerant to the battery coolant and cabin coolant heat exchanger so that the battery coolant may be warmed within the heat exchanger.

The method is next operative for determining 420 a vehicle cabin HVAC setting. The vehicle cabin HVAC setting may be determined in response to a user input at a user interface within the vehicle cabin. The vehicle cabin HVAC setting may further be determined in response to a vehicle cabin temperature. For example, a vehicle operation may set the HVAC cabin temperature setting to 20° C. If the vehicle cabin temperature is above 20° C., cabin cooling may be required. If the vehicle cabin temperature is below 20° C., cabin heating may be required.

The method is next configured for regulating 425 the transfer of heat between the refrigerant loop and the battery coolant loop in response to a temperature of the battery coolant within the battery coolant loop. In some exemplary embodiments, transfer of heat between the refrigerant loop and the battery coolant loop may be regulated by controlling the coolant flow rate in the battery coolant loop. To control the coolant flow rate, the flow rate of a coolant pump may be adjusted to reduce or increase the flow rate. Alternatively, an electronically controlled thermostat, or flow rate regulator may be used.

The method is next operative for determining 430 the cabin coolant temperature. The cabin coolant loop is configured to transfer heat with the battery coolant loop as well as the refrigerant loop within the heat exchanger. Thus the amount of heat transferred will be dependent on the operating configuration of the refrigerant loop and the amount of heat transferred between the vehicle battery and the battery coolant loop. In order to effectively configure and control the cabin coolant loop in light of the variable battery coolant loop temperature, the temperature of the cabin coolant loop must be first determined. The cabin coolant loop temperature may be determined with a temperature sensor or the like within the cabin coolant loop. The cabin coolant temperature is measured within the cabin portion of the cabin coolant loop.

To regulate the temperature of the vehicle cabin in response to the HVAC setting, the method first determines 435 if the cabin coolant temperature is within a required range corresponding to the HVAC setting. For example, if the HVAC setting calls for a cabin temperature of 20° C. with a current cabin temperature of 15° C., a required temperature range for the cabin coolant temperature may be between 25° C. and 55° C. If the cabin coolant temperature is within the required range, the cabin coolant temperature may be regulated 440 using a coolant pump to continue to circulate the cabin coolant through the refrigerant, battery coolant heat exchanger and into the cabin coolant/air heat exchanger. Vehicle cabin temperature may be regulated 440 by activating and controlling the rotational speed of a vehicle cabin fan for circulating air through the coolant/air heat exchanger.

If the cabin coolant temperature is not within the required range, the method may next be configured to isolate 445 the cabin side of the cabin coolant loop from the refrigerant battery coolant heat exchanger side of the cabin coolant loop using a coolant bypass valve or the like. The method may next determine if the cabin coolant loop temperature on the cabin side of the loop is less than a threshold temperature value determined in response to the HVAC setting and the current vehicle cabin temperature. If the cabin coolant temperature is greater than a threshold, the vehicle cabin temperature may then be regulated 440 by activating and controlling the rotational speed of a vehicle cabin fan for circulating air through the coolant/air heat exchanger.

If the cabin coolant temperature is less than a threshold, a TPC heater may be activated 455 within the cabin side of the cabin coolant loop. The vehicle cabin temperature may then be regulated 440 by activating and controlling the rotational speed of a vehicle cabin fan for circulating air through the coolant/air heat exchanger and by regulating a temperature or duty cycle of the TPC heater.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An electric vehicle thermal management system comprising:
   a user interface for receiving a HVAC setting;
   a centrifugal compressor for compressing a low pressure refrigerant in a refrigerant loop to generate a high pressure refrigerant;
   an expansion valve for reducing a pressure of the high pressure refrigerant in the refrigerant loop to generate the low pressure refrigerant;
   a heat exchanger coupled to the refrigerant loop, a battery coolant loop and a cabin coolant loop; and
   a processor for detecting a battery cooling condition, routing one of the low pressure refrigerant and the high pressure refrigerant to the heat exchanger in response to the battery cooling condition, regulating the transfer of heat between the refrigerant loop and the battery cooling loop in response to a temperature of the battery coolant within the battery cooling loop and the battery cooling condition, and regulating the transfer of heat between the battery coolant loop and the cabin coolant loop in response to the HVAC setting and a cabin coolant temperature within the cabin coolant loop, wherein the processor is further operative for isolating a cabin portion of the cabin coolant loop from a heat exchanger portion of the cabin coolant loop in response to the cabin coolant temperature being less than a threshold temperature wherein the threshold temperature is determined in response to the HVAC setting and a vehicle cabin temperature, and activating a coolant heater within the cabin portion of the cabin coolant loop in response to the HVAC setting and the cabin coolant temperature being less than the threshold temperature.

2. The electric vehicle thermal management system of claim 1 wherein routing the refrigerant in response to the battery cooling condition includes routing one of the high pressure refrigerant and the low pressure refrigerant to the heat exchanger by a reversable valve.

3. The electric vehicle thermal management system of claim 1, wherein the low pressure refrigerant is routed to the heat exchanger in response to the battery cooling condition being a cooling condition and wherein the high pressure refrigerant is routed to the heat exchanger in response to the battery cooling condition being a heating condition.

4. The electric vehicle thermal management system of claim 1, wherein the cabin coolant temperature is measured within the cabin portion of the cabin coolant loop.

5. The electric vehicle thermal management system of claim 1, wherein the transfer of heat between the refrigerant loop and the battery cooling loop is performed by regulating a speed of a battery coolant pump.

6. The electric vehicle thermal management system of claim 1, wherein the transfer of heat between the cabin coolant loop and the battery cooling loop is performed by regulating a speed of a cabin coolant pump.

7. The electric vehicle thermal management system of claim 1, further including a heater core coupled to the cabin coolant loop for exchanging heat between the cabin coolant and a vehicle cabin air.

8. The electric vehicle thermal management system of claim 1, wherein the battery cooling condition is determined in response to a charging state of a battery.

9. The electric vehicle thermal management system of claim 1, wherein the battery cooling condition is determined in response to a battery temperature.

10. A method comprising:
    compressing a low pressure refrigerant with a centrifugal compressor to generate a high pressure refrigerant;
    determining a battery cooling condition;
    routing one of the low pressure refrigerant and the high pressure refrigerant to the heat exchanger in response to the battery cooling condition;
    regulating a transfer of heat between the refrigerant loop and the battery cooling loop in response to a temperature of the battery coolant within the battery cooling loop and the battery cooling condition;
    regulating the transfer of heat between the battery coolant loop and a cabin coolant loop in response to the HVAC setting and a cabin coolant temperature within the cabin coolant loop
    isolating a cabin portion of the cabin coolant loop from a heat exchanger portion of the cabin coolant loop in response to the cabin coolant temperature being less than a threshold temperature wherein the threshold temperature is determined in response to the HVAC setting and a vehicle cabin temperature; and
    activating a coolant heater within the cabin portion of the cabin coolant loop in response to the HVAC setting and the cabin coolant temperature being less than the threshold temperature.

11. The method of claim 10 further including:
    isolating a cabin portion of the cabin coolant loop from a heat exchanger portion of the cabin coolant loop in response to the cabin coolant temperature being less than a threshold temperature wherein the threshold temperature is determined in response to the HVAC setting and a vehicle cabin temperature; and activating a coolant heater within the cabin portion of the cabin coolant loop in response to the HVAC setting and the cabin coolant temperature being less than the threshold temperature.

12. The method of claim 10 wherein the low pressure refrigerant is coupled to the heat exchanger for cooling the battery and the high pressure refrigerant is coupled to the heat exchanger for warming the battery.

13. The method of claim 10 wherein a rotational speed of the centrifugal compressor is regulated in response to the battery cooling condition.

14. The method of claim 10 wherein the battery cooling condition is determined in response to an ambient temperature.

15. The method of claim 10 wherein the transfer of heat between the battery coolant loop and a cabin coolant loop is regulated by varying a flow rate of a cabin coolant pump.

16. The method of claim 10 wherein the transfer of heat between the refrigerant loop and the battery cooling loop is regulated by varying a flow rate of a battery coolant pump.

17. The method of claim 10 wherein the transfer of heat between the battery cooling loop and a vehicle cabin is regulated by varying a flow rate of a battery coolant pump and a speed of a vehicle cabin fan.

18. A system comprising:
   a heat exchanger configured to exchange heat between a refrigerant loop, a battery coolant loop and a cabin coolant loop;
   a centrifugal compressor for compressing a low pressure refrigerant in the refrigerant loop to generate a high pressure refrigerant;
   an expansion valve for reducing a pressure of the high pressure refrigerant in the refrigerant loop to generate the low pressure refrigerant;
   a valve for coupling one of the high pressure refrigerant and the low pressure refrigerant to the heat exchanger via the refrigerant loop in response to a valve control signal;
   a battery coolant pump for regulating the flow of a battery coolant in response to a battery coolant pump control signal;
   a cabin coolant pump for regulating the flow of a cabin coolant in response to a cabin coolant pump control signal; and
   a processor for determining a battery cooling condition in response to a battery temperature, generating the valve control signal and the battery coolant pump control signal in response to the battery cooling condition and the battery temperature, and generating the cabin coolant pump control signal in response to an HVAC setting and a cabin coolant temperature;
   a bypass valve for isolating a cabin portion of the cabin coolant loop from a heat exchanger portion of the cabin coolant loop in response to the cabin coolant temperature being less than a threshold temperature wherein the threshold temperature is determined in response to the HVAC setting; and
   a coolant heater within the cabin portion of the cabin coolant loop for heating the cabin coolant in response to the cabin coolant temperature being less than the threshold temperature.

\* \* \* \* \*